Figure 5:
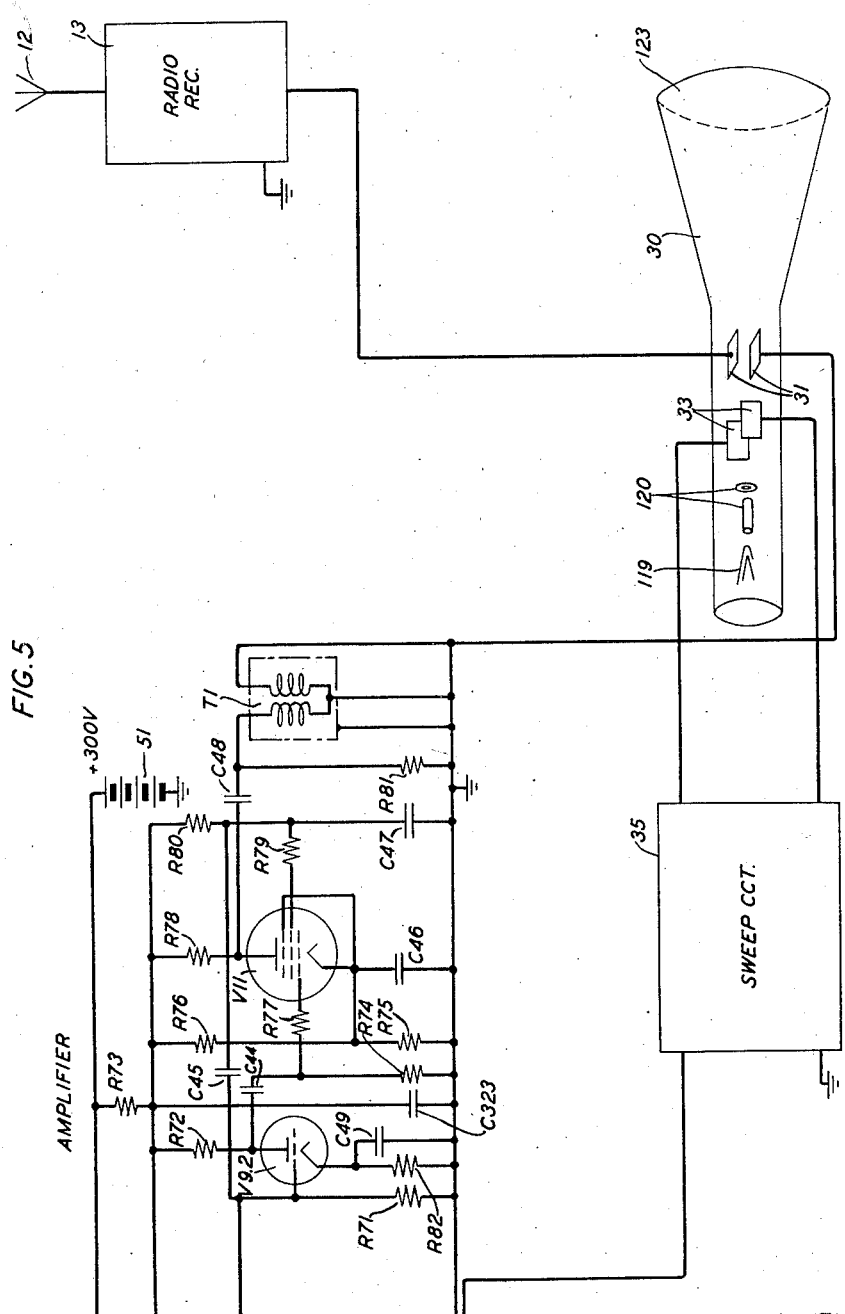

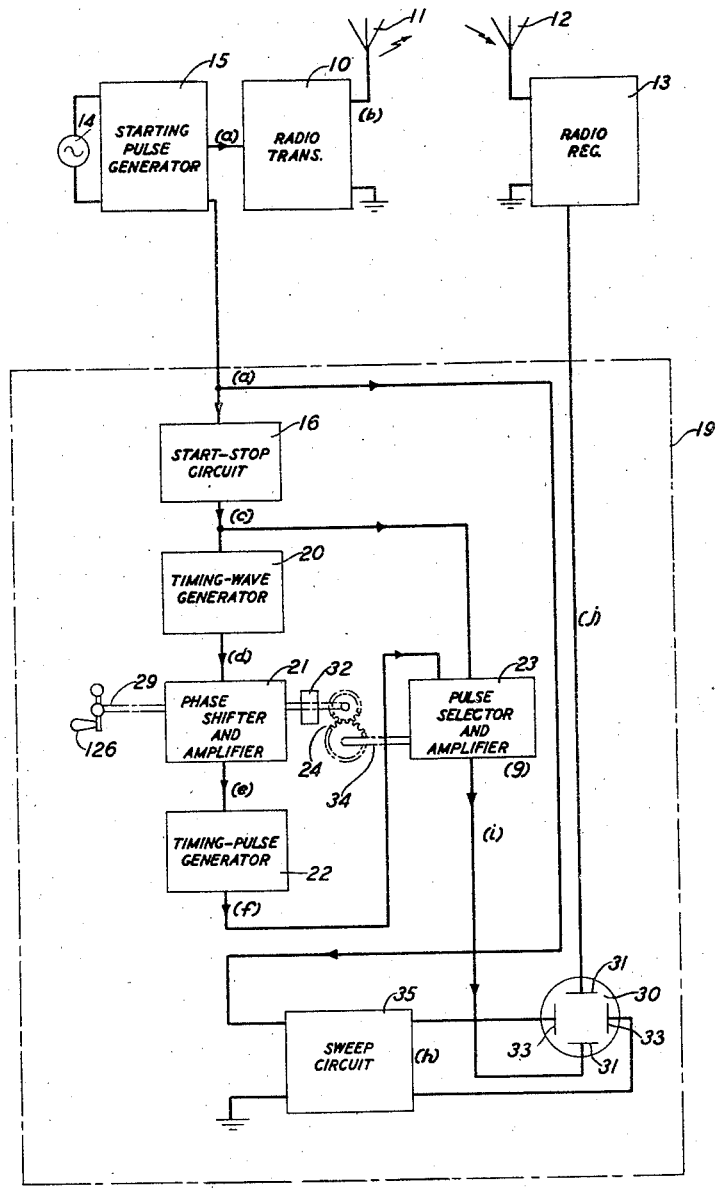

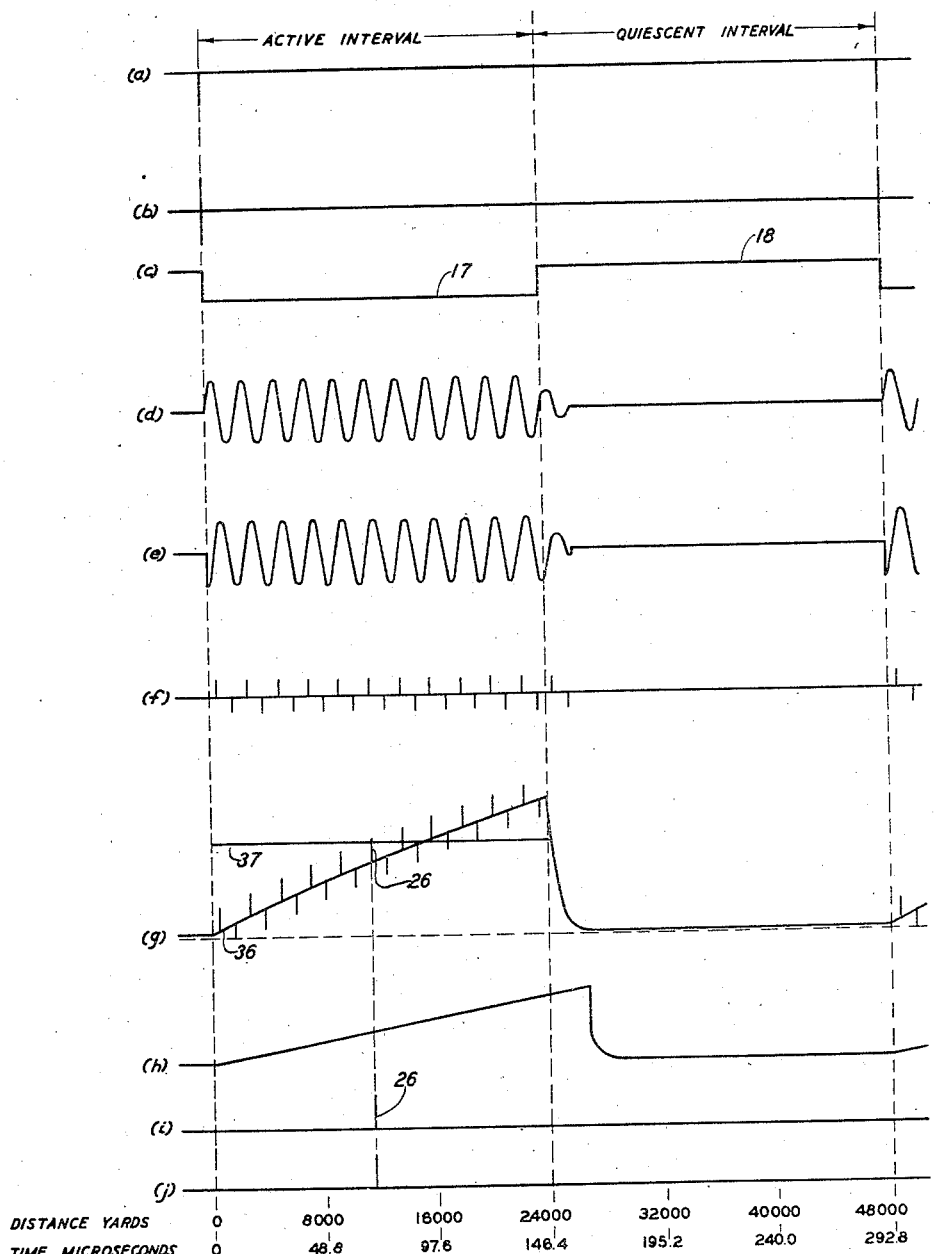

Jan. 20, 1948. L. A. MEACHAM 2,434,669
OSCILLATION GENERATOR
Original Filed Oct. 5, 1943 5 Sheets-Sheet 3
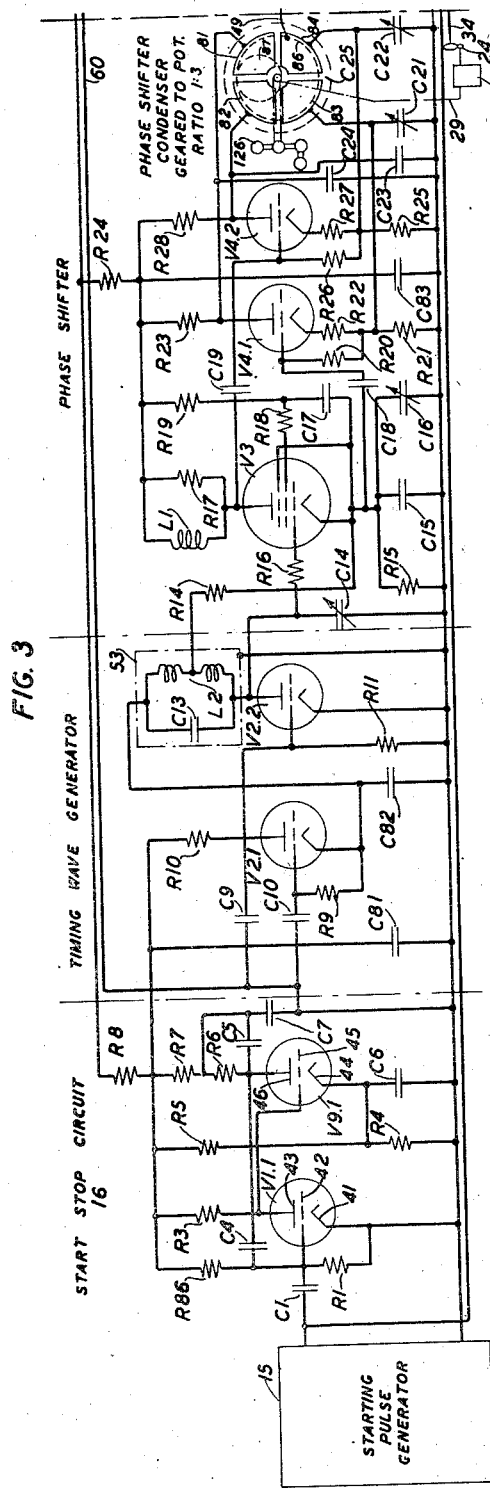
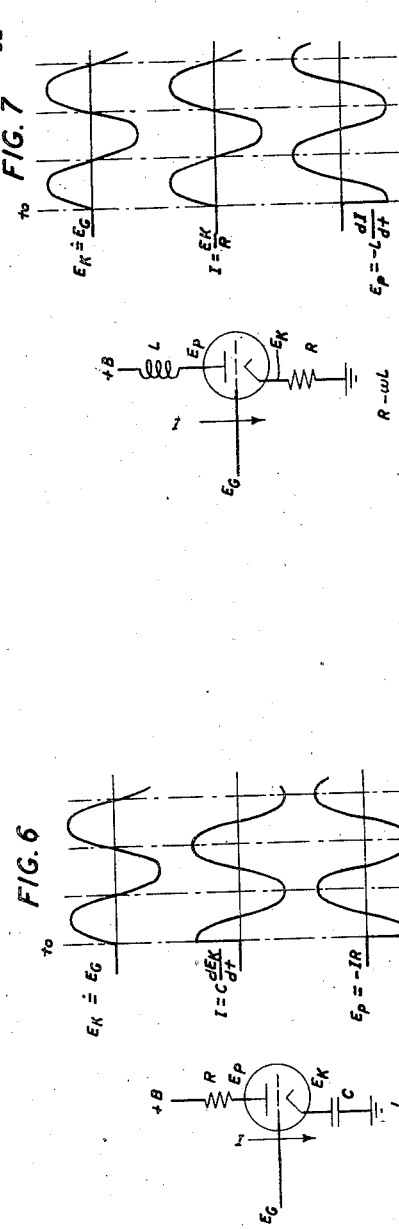
INVENTOR
L. A. MEACHAM
BY
ATTORNEY Jan. 20, 1948.  L. A. MEACHAM  2,434,669
OSCILLATION GENERATOR
Original Filed Oct. 5, 1943   5 Sheets-Sheet 4
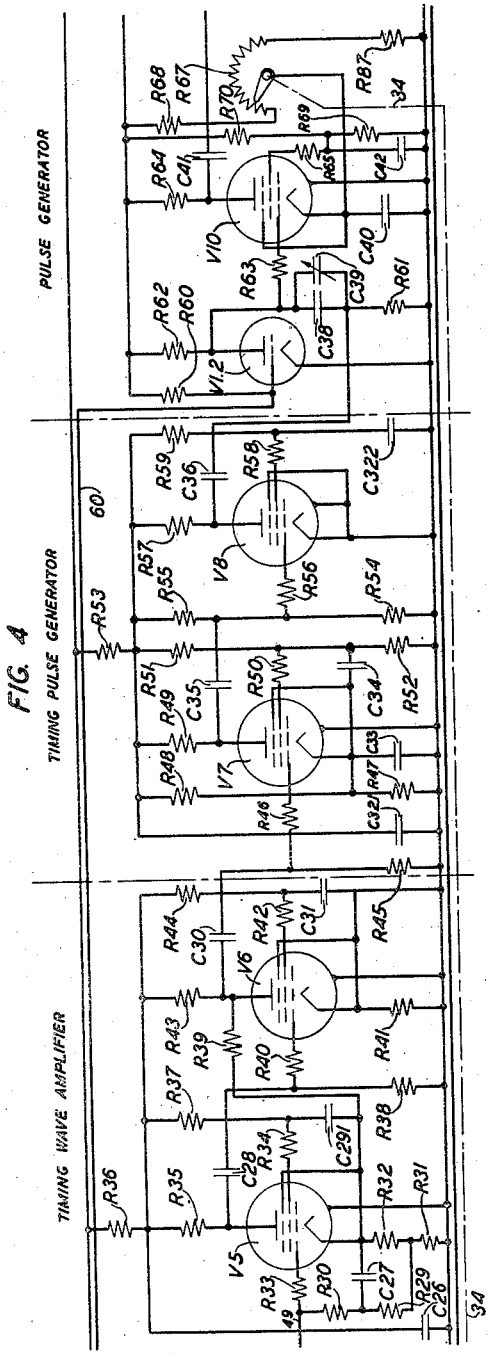
FIG. 4
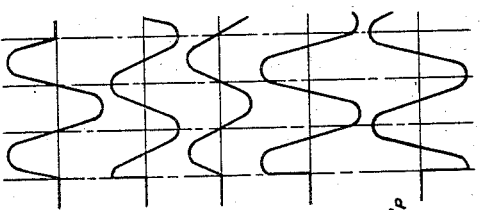
FIG. 9
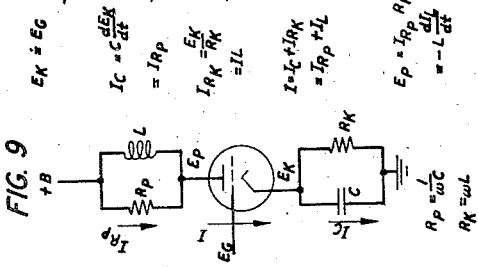
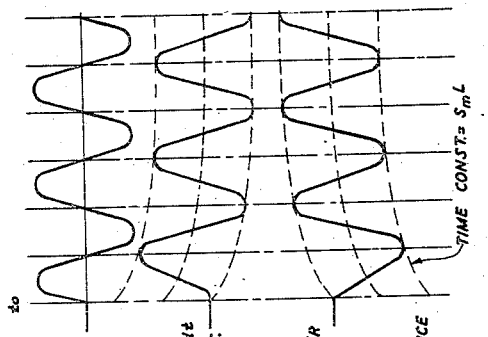
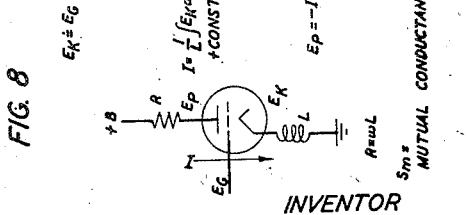
FIG. 8
INVENTOR
L. A. MEACHAM
BY
G. F. Heuerman
ATTORNEY Patented Jan. 20, 1948

2,434,669

UNITED STATES PATENT OFFICE 2,434,669

OSCILLATION GENERATOR

Larned A. Meacham, Summit, N. J., assignor to Bell Telephone Laboratories, Incorporated, New York, N. Y., a corporation of New York Original application October 5, 1943, Serial No. 505,024. Divided and this application January 31, 1945, Serial No. 575,449

6 Claims. (Cl. 250—36)

This invention relates to electric wave generating apparatus and particularly to an oscillation generator which is adapted for use in an electrical range or distance indicating system.

This application is a division of application Serial No. 505,024, filed October 5, 1943 (United States Patent No. 2,422,205, June 17, 1947).

In a specific embodiment of the invention herein shown and described for the purpose of illustration, recurrent pulses of energy are radiated to an object, echo pulses are received from the object, and an indication of the distance from the pulse radiator and receiver to the object is produced. To produce this distance indication, means are provided for generating range pulses which are delayed with respect to corresponding reference pulses by an amount equal to the delay between the radiated pulses and the corresponding echo pulses. There is provided a range indicator which is preferably calibrated to indicate the distance to the object directly, a delay of one microsecond between a radiated pulse and its received echo corresponding to a distance of 164 yards, approximately. A range indicating apparatus of this general type is disclosed in my copending application Serial No. 491,791, filed June 22, 1943 (United States Patent No. 2,422,204, June 17, 1947) but the apparatus described in this application is in some respects an improvement thereover. Portions of the range indicating apparatus shown and described herein may obviously be substituted for corresponding portions of the range indicating apparatus shown and described in said copending application. There is employed a start-stop circuit, similar to the start-stop circuit of said copending application, upon which are impressed pulses in synchronism with the radiated pulses for causing the generation of a square voltage wave. This wave has a negative portion starting with the pulse impressed upon the circuit, which portion has a duration equal to or preferably greater than the maximum delay occurring between the time of radiation of a pulse and the time of reception of an echo of the radiated pulse. This negative portion is followed by a positive portion which occupies a time interval during which the circuit is returned to its stable waiting condition ready to be started again by a succeeding pulse. A timing wave generator comprising an antiresonant circuit is started due to the abrupt decrease in potential at the start of the negative portion of the wave from the start-stop circuit and the timing wave is quickly quenched due to the positive portion of the start-stop wave. Two triode electronic devices having their anode-cathode paths in series with the antiresonant circuit are provided for alternately abruptly interrupting and starting the flow of current through the antiresonant circuit in response to the square wave from the start-stop circuit impressed upon the control electrodes of the triodes simultaneously. A feedback path is provided for maintaining the output voltage of the generator at constant amplitude.

A phase shifter is provided for continuously shifting in either direction, the phase of the wave from the timing wave generator. The phase shifter comprises an improved wave generating circuit which produces, under control of the timing wave, two voltage waves which are accurately in quadrature and which start coincidently with each timing wave train. The production of a prolonged starting transient, such as is produced by a simple resistance-capacity phase splitter, is thus avoided. The wave generator employs an electronic device having a high mutual conductance and such an arrangement of related impedance elements in its anode-cathode circuit that, when a varying potential is impressed upon its control electrode, there are produced at the anode and cathode, respectively, potential waves one of which is proportional to the derivative of the other, that at the cathode being an accurate copy of the impressed potential. When the timing wave applied to the control electrode is sinusoidal and has an initial phase such that there is no abrupt change in instantaneous potential, there is preferably employed a path comprising inductance and resistance in shunt with respect to each other between the anode and a source of anode current and a path comprising capacitance shunted by resistance between the cathode and the current source, the first-mentioned resistance being equal to the capacitive reactance and the second-mentioned resistance being equal to the inductive reactance. The phase shifting circuit also comprises a phase shifter condenser, similar to the phase shifting condenser of said copending application. The timing wave from the phase shifting circuit is amplified and the amplified wave supplied to a pulse generator which produces a series of alternately positive and negative sharp pulses which are accurately spaced by a predetermined interval.

A pulse selector is provided for generating a pulse which is coincident with a desired one of each group of timing pulses. This pulse selector makes use of a circuit having resistance R and capacitance C of fixed time constant, the charging of the capacitance being initiated in response to the wave front of each negative portion of the square wave from the start-stop circuit. There is provided an electronic device having a plurality of electrodes comprising a cathode, a control electrode and an anode, which device is normally non-conducting and which is made conducting coincidently with one of the timing pulses to cause a selected timing pulse to be generated. The exponentially rising potential due to the charging of the condenser is applied to the control electrode, there is applied to the cathode a potential which is varied by means of a potentiometer, and the timing pulses are superposed on one of these potentials. One of the timing pulses will thus bring the control grid to a sufficiently high potential with respect to the cathode potential to cause anode current to flow and a range pulse to be produced at the anode, the time of selection of a timing pulse to form a range pulse varying in accordance with the setting of the potentiometer which controls the cathode potential. The resistance of the potentiometer is non-uniformly distributed to correct for the non-linearity of the potential rise due to the charging of the condenser and the potentiometer shaft is geared to the shaft of a phase shifting condenser in the phase shifter so that the delay between the radiated pulse and the selected timing pulse may be varied continuously.

The range indicating apparatus has a small minimum delay, say about one microsecond. A fixed delay circuit, the delay of which is equal to or greater than this minimum delay of the range unit is preferably included in the radio receiver so that when the transmitted pulses are directly impressed upon the receiver, the resulting pulses from the receiver may be made coincident with the corresponding range pulses from the range unit when the range indicator is set for zero distance. The range pulses are impressed upon one plate and the echo pulses are impressed upon the other plate of a pair of deflecting plates of a cathode ray tube, a linear sweep wave being applied to another pair of deflecting plates for deflecting the cathode ray beam perpendicularly with respect to the deflection due to the field set up by the first pair of plates. To determine the range of an object, the delay of the range unit is varied unil the visible indication due to the range pulses on the screen of the cathode ray tube is in alignment with the indication on the screen due to the echo pulses from the radio receiver. The range of the object from which the echoes are received may then be read on the indicator of the range unit.

If desired, the range pulses which are brought into coincidence with the echo pulses for causing a range indication to be produced may be used together with the echo pulses to control apparatus for automatically controlling the phase shifting condenser and potentiometer of the range indicator to maintain the range pulses and the echo pulses in synchronism. An apparatus of this type is disclosed in a copending application of B. M. Oliver, Serial No. 491,829, filed June 22, 1943.

The invention will now be described with reference to the accompanying drawing in which:

Fig. 1 is a block diagram of a ranging system in accordance with the present invention;

Fig. 2 consists of curves to which reference will be made in describing the invention;

Figs. 3, 4 and 5, when Fig. 3 is placed to the left of Fig. 4 and Fig. 5 is placed to the right of Fig. 4, are a schematic view of a range indicator in accordance with the present invention; and Figs. 6 to 9, inclusive, are diagrams to which reference will be made in describing the invention.

Referring now particularly to Figs. 1 and 2, there is disclosed a range indicating system in which recurring brief pulses of high frequency electromagnetic wave energy are produced by a transmitter 10 and radiated from a directional antenna 11 toward an object the distance of which is to be determined and in which the wave pulses reflected from the object are received by antenna 12 and detected by a radio receiver 13. An oscillator 14 produces a sinusoidal wave having a period somewhat longer than the time required for a radio wave to travel twice the maximum distance to be measured. Starting pulse generator 15 produces pulses as indicated at $a$, Fig. 2, at regular intervals, one for each cycle of the sine wave from oscillator 14. It is not essential to the operation of the system, however, that these pulses occur at regular intervals. The starting pulses $a$ which are of very brief duration, say one-quarter miscrosecond, key the radio transmitter 10 to cause the radiation of corresponding pulses $b$ of high frequency radio energy. The starting pulse generator 15 and radio transmitter 10 may be the same as the impulse generator and radio transmitter described in my copending application supra. The starting pulses $a$ are also impressed upon a range indicator 19 to produce output or range pulses $i$ which are delayed by a desired amount with respect to the starting pulses $a$. The range indicator has a small fixed minimum delay, about one microsecond, and a delay circuit having a delay at least equal to this minimum delay is preferably included in the radio receiver 13 so that the pulses $j$ from the receiver and the corresponding range pulses $i$ from the range unit may be adjusted to be coincident when the transmitted pulses $b$ are directly impressed upon the radio receiver 13, and when the range indicator is set for zero distance.

The starting pulses $a$ are impressed upon a start-stop circuit 16 of the range unit for generating a square voltage wave $c$ having an initial negative portion 17 starting coincidently with a starting pulse $a$ and a positive portion 18. The intervals during which the negative portions 17 of wave $c$ occur mark the active periods of the range indicating apparatus and the intervals during which the positive portions 18 occur mark the quiescent periods of the apparatus when in operation. These active periods remain fixed while the quiescent periods may vary with frequency variations of source 14 within a limited range.

The voltage wave $c$ produced by the start-stop circuit is impressed upon a timing wave generator 20 which generates a succession of trains of constant frequency oscillatory waves $d$ the phase of which may be shifted continuously through a plurality of cycles by turning the handle 126 of a phase shifter 21. The phase shifted timing wave, indicated at $e$ of Fig. 2, starts with an abrupt departure from zero to whatever initial instantaneous amplitude corresponds to its phase position. The period of this oscillatory wave, or a phase shift of the wave through a single cycle, corresponds to the time interval required for a radiated wave to travel through a certain distance and for its echo to return through that distance. The distance represented by a single cycle of the oscillatory wave is the velocity of propagation of the radiated pulse divided by twice the timing frequency of the oscillatory wave. The timing wave $e$ from the output amplifier of the phase shifter 21 is impressed upon a timing pulse generator 22 which produces alternate positive and negative timing pulses $f$, a pulse being produced at the beginning of each half cycle of the timing wave. The square wave $c$ from the start-stop circuit and the timing pulses $f$ from the timing pulse generator are impressed upon a pulse selector 23 which selects one of the timing pulses 26 of each group of timing pulses which is delayed by a desired interval with respect to the corresponding starting pulse $a$, as shown at $i$, Fig. 2. As indicated at $g$ in Fig. 2, an exponentially rising potential 36 having the timing pulses $f$ superposed thereon is impressed upon a control electrode of an electronic device and a potential 37 which may be varied by means of a potentiometer is impressed upon the cathode of the electronic device to cause the selection of a pulse 26 which causes the control electrode potential to increase sufficiently with respect to the cathode potential to cause the flow of anode current through the electronic device. The shaft 34 of the potentiometer of the pulse selector 23 is connected through the gears 24 to the shaft 29 of a phase shifting condenser of the phase shifter 21 so that the change in cathode potential 37 is equal to the change in peak potential of a superposed timing pulse, such as pulse 26, due to the phase shift of the timing pulses, the resistance of the potentiometer being tapered to correct for the curvature of the exponentially rising potential 36. Only one pulse of each group of timing pulses appears at the output of the pulse selector 23, the pulses of each group which follow a selected pulse being blocked by the output amplifier of the pulse selector.

The echo pulses $j$ are impressed upon one of the vertical deflecting plates 31 of a cathode ray tube 30 and the range pulses $i$ are impressed upon the other vertical deflecting plate. If desired, of course, a step pulse may be produced under control of the selected pulse $i$ and impressed upon a vertical deflecting plate of the cathode ray tube for producing a range mark on the cathode ray tube screen as disclosed in my copending application, supra. Any suitable linear sweep wave $h$ may be impressed upon the horizontal deflecting plates of the cathode ray tube 30. As shown, the sweep wave generator 35 is controlled by the starting pulses $a$ from starting pulse generator 15 to maintain the sweep wave in synchronism with the starting pulses. Alternatively the pulses $i$ could be utilized for controlling the sweep wave generator and pulses which are delayed by a short fixed period with respect to the pulses $i$ could be used as the range pulses impressed upon a vertical deflecting plate of the cathode ray tube. By rotating shaft 29 of the phase shifter condenser to which the potentiometer of the pulse selector is geared, a range mark produced by range pulses $i$ may be caused to travel across the luminescent screen of the cathode ray tube until it is brought into alignment with an echo mark produced by echo pulses $j$. The distance to the object from which the echo pulses are received may then be read directly from a revolution counter or range indicator 32 attached to shaft 29.

The range indicating apparatus is shown in greater detail in Figs. 3, 4 and 5 when Fig. 3 is placed to the left of Fig. 4 and Fig. 5 is placed to the right of Fig. 4. A suitable starting pulse generator and radio transmitter are shown in my copending application supra and are therefore not being described in detail herein. The start-stop circuit 16 is similar to the start-stop circuit described in said copending application but is designed to prevent the false triggering of the circuit by extraneous pulses of smaller amplitude than that of the starting pulses $a$. The start-stop circuit employs two electronic triodes V1.1 and V9.1, triode V1.1 having a cathode 41, a control electrode 42, and an anode 43 and triode V9.1 having a cathode 44, a control electrode 45 and an anode 46. Negative starting pulses $a$ from the starting pulse generator 15 are applied through a 50-micromicrofarad condenser C1 across 0.5-megohm resistor R1 which is connected between the control electrode 42 and the grounded cathode 41. The anode 43 is directly conductively connected to the control electrode 45 and the anode 46 is connected to the control grid 42 through a condenser C4 the capacity of which is 400 micromicrofarads when a maximum range of 22,000 yards is to be measured. For this range the alternating current source 14 may have any frequency up to about 4,000 cycles. The cathode 44 is connected to ground through 15,000-ohm resistor R4 shunted by a 500-micromicrofarad condenser C6. Anode potential is supplied to the anode 43 from the positive terminal of 300-volt battery 51 through series resistors R8 (1,000 ohms) and 0.1-megohm resistor R3, the negative battery terminal being grounded. Positive voltage from source 51 is supplied to anode 46 through series resistors R8, R7 (18,000 ohms) and R6 (18,000 ohms). The positive battery terminal is also connected through series resistors R8 and R5 (56,000 ohms) to the cathode 44. A 50-micromicrofarad condenser C5 is connected in shunt with respect to resistor R6. A filter condenser C81 of 0.1 microfarad is connected between the negative terminal of resistor R8 and ground. A resistor R86 of 1.8 megohms is connected between the negative terminal of resistor R8 and control grid 42 to maintain the grid positive with respect to cathode 41 during quiescent periods and thus to lower the input impedance and prevent false operation of the circuit due to extraneous pulses during this period. The negative pulse $a$ applied to the control grid 42 causes the interruption of anode current in triode V1.1, to make the potential at anode 43 and at control grid 45 more positive. Anode current is thus caused to flow in triode V9.1. Triode V1.1 continues to be cut off and V9.1 continues to be conducting during the active period due to the discharge current of condenser C4 flowing through the anode-cathode path of triode V9.1 and resistor R1 and the resulting negative bias on the control grid 42. At the end of the active period, this discharge current and the resulting grid bias reach a sufficiently low value to cause the triode V1.1 to pass anode current and during the following quiescent period the condenser C4 is again charged through resistors R6 and R7 and the control electrode-cathode path of triode V1.1. When the triode V9.1 becomes conducting, the potential at the common terminal of resistors R6 and R7 becomes less positive with respect to ground and, when the conduction through triode V9.1 is interrupted the common terminal of resistors R6 and R7 becomes more positive, thus producing the start-stop wave $c$.

The start-stop wave $c$ from the start-stop circuit is impressed upon the input circuits of triodes V2.1 and V2.2 of the timing wave generator 20. The common terminal of resistance R6 and R7 is connected through 0.01-microfarad condenser C7 and 0.01-microfarad condenser C9, to the control electrode of triode V2.2 which is connected through 1-megohm resistor R11 to the grounded cathode. The common terminal of resistors R6 and R7 is also connected through condenser C7 and 0.01-microfarad condenser C10 to the control electrode of triode V2.1 which is connected through 1-megohm resistor R9 to the cathode. The anode current paths for triodes V2.1 and V2.2 may be traced from the positive 300-volt terminal through resistor R8, 10,000-ohm resistor R10, the anode-cathode path of triode V2.1, the antiresonant circuit comprising 3.66-millihenry inductor L2 shunted by 1,000-micromicrofarad condenser C13 and the anode-cathode path of triode V2.2 to ground. The anode-cathode path of tube V2.2 is shunted by 25-micromicrofarad variable condenser C14. Condenser C82 of 0.1 microfarad is connected between the cathode of triode V2.1 and ground. The inductance L2 and the condenser C13 are enclosed within a grounded shield 53. This shielded antiresonant circuit is placed in a suitable oven (not shown) the temperature of which is maintained constant in order to avoid frequency variations due to temperature change. During each quiescent period a current of about 10 milliamperes flows in the anode current circuit of triodes V2.1 and V2.2, the voltage drop across each of the anode-cathode paths of these tubes and that across resistor R10 being about 100 volts. The interruption of the anode current from the 300-volt source due to the negative portion 17 of the start-stop wave impressed upon the control grids of triodes V2.1 and V2.2 simultaneously starts the oscillatory timing wave d in the circuit. The oscillatory wave is quenched during the early portion of the quiescent period due to the positive portion 18 of the start-stop wave applied to the control grids of triodes V2.1 and V2.2. The frequency of the timing wave is 81.955 kilocycles which corresponds to a range of 2,000 yards per cycle. When anode current is flowing in the circuit, condenser C82 is charged to about 100 volts and this charge is maintained during the active periods of the range indicator when the triodes V2.1 and V2.2 are non-conducting. Control of the current by the two triodes, acting simultaneously, results in keeping the potential across C82 or between the upper end of L2 and ground constant at all times.

In order that succeeding stages of the range unit may behave uniformly throughout the active period, the timing wave is sustained at constant amplitude by means of a positive feedback which is conveniently provided through the cathode follower action of the electronic device V3 of the phase shifter circuit, as will be described below. The anode-cathode circuit of this tube may be traced from the 300-volt source through 1,000-ohm resistor R24, inductor L1 of 11.64 millihenries in parallel with 6,000-ohm resistor R17, the anode-cathode path, 10,000-ohm resistor R15 in parallel with 250-micromicrofarad condenser C15 and 100-micromicrofarad variable condenser C16, to ground. The anode of triode V2.2 is connected through 100-ohm resistor R16 to the control electrode and a mid-tap of inductor L2 is connected through 47,000-ohm resistor R14 to the cathode. Screen grid potential is supplied to the tube through 20,000-ohm resistor R19 and 100-ohm resistor R18 with the common terminal of R19 and R18 connected to the cathode through 0.1-microfarad condenser C17. The tube V3 has a high mutual conductance and the impedance between the cathode of V3 and ground is sufficiently high to cause the alternating component of the potential at the cathode with respect to ground to be an accurate copy of the potential at the control grid with respect to ground. The steady state impedance of the antiresonant circuit C13, L2, is about 200,000 ohms and is essentially resistive at its natural frequency. The impedance looking in at the mid-tap of inductance coil L2 is one-quarter of this value or approximately 50,000 ohms. Accordingly, if R14 is matched to this approximately 50,000-ohm impedance, one-half of the cathode voltage will be impressed across the upper half of the coil L2 (the upper terminal being connected through condenser C82 to ground). Due to the autotransformer action between the upper half of coil L2 and the entire coil, the voltage at the lower terminal will be double that at the mid-tap of coil L2. In other words, a voltage equal to the cathode voltage is impressed upon the grid and the net gain of the feedback path is equal to unity and, when this condition exists, no rapid increase or decrease in amplitude of the timing wave can occur. The resistance of resistor R14 may be varied until this unity gain is obtained. Since the timing wave is interrupted after about 11 cycles have been generated, a small departure from unity gain of the feedback path would not cause an appreciable change in amplitude.

The use of tube V3 and its associated circuit to provide feedback for the oscillatory circuit C13, L2, is a secondary one. The primary purpose of this circuit is to generate two waves of substantially equal amplitude which are accurately in quadrature with respect to each other starting substantially at the first instant of each wave train. A starting transient, lasting through a considerable fraction of a cycle of the timing wave, such as is produced with a simple resistance-capacity phase splitting circuit, is thus avoided.

The method of obtaining the quadrature voltages will be explained with reference to Figs. 6, 7, 8 and 9, each of which shows the cathode, control electrode and anode of electric discharge device V3. The curves in each figure show the alternating component of the cathode potential $E_K$, which is substantially the same as the grid potential $E_G$, the current I through the anode-cathode path and the anode potential $E_P$, all potentials being with respect to ground. In Fig. 9 the two components of current I, namely, $I_C$ and $I_{R_K}$ are also shown.

In Fig. 6 a resistance R is connected between the anode and the positive terminal of the anode voltage source (+B), the negative terminal of the anode voltage source being grounded in each case. A capacitance C is connected between the cathode and ground. The time $t_0$ is the instant at which the current in the circuit of inductance L2 is interrupted to start the generation of the timing wave. The timing wave potential is impressed upon the grid in each case and it is assumed that the electronic tube has a mutual conductance so large that the difference between the grid potential $E_G$ and the cathode potential $E_K$ is negligible. The current in the circuit is $$I = C\frac{dE_K}{dt}, \text{ and } E_P = -IR = -RC\frac{dE_K}{dt}$$

That is, $E_P$ is proportional to the derivative of $E_K$. In the absence of tube overloading, this relationship is true for both the steady-state timing wave and the discontinuity at time $t_0$. If in the steady state $$E_K = A \sin \omega t$$

where $\omega = 2\pi f$ or approximately 6.28 times the frequency $$E_P = -RC\frac{d(A \sin \omega t)}{dt} = -RC(\omega A \cos \omega t)$$

In order to make the amplitude of the anode potential wave equal to the cathode potential wave, R is made equal to $$\frac{1}{\omega C}$$

so that $$RC = \frac{1}{\omega}$$

Then $$E_P = -\frac{1}{\omega}(\omega A \cos \omega t) = -A \cos \omega t$$

$E_P$ and $E_K$ are thus equal in amplitude but 90 degrees out of phase with respect to each other. This arrangement of Fig. 6 suffers from the fact that no unidirectional space current can flow in the circuit because the cathode is connected to ground only through a condenser. This difficulty can be obviated by connecting a high resistance or a high inductance path across the condenser C but such a modified circuit would cause the introduction of some phase error.

In the arrangement illustrated in Fig. 7, an inductance L is connected between the positive terminal of the unidirectional voltage source +B and the anode, and a resistance R is connected between the cathode and ground. In this case $$I = \frac{E_K}{R}$$

and $$E_P = -L\frac{dI}{dt} = -\frac{L}{R}\frac{dE_K}{dt}$$

If, as before $$E_K = A \sin \omega t$$

$$E_P = -\frac{LA\omega \cos \omega t}{R}$$

and if $R = \omega L$, $E_P = -A \cos \omega t$. As before, $E_P$ and $E_K$ are in quadrature and $E_P$ is proportional to the derivative of $E_K$. In this embodiment there is the practical difficulty that the sudden rise of voltage across the inductance shock-excites it in antiresonance with its stray capacitance and this results in objectionable irregularities in the wave shape.

In the arrangement illustrated in Fig. 8 a resistance R is connected between the anode and a positive terminal of the direct voltage source and an inductance L is connected between the cathode and ground. In this case the current $$I = \frac{1}{L}\int E_K dt + \text{constant of integration}$$

and $$E_P = -IR = -\frac{R}{L}\int E_K dt - R \text{ (constant)}$$

When the cathode wave $E_K$ starts as shown in Fig. 8, the constant in these expressions acquires a positive value equal to the peak value of the alternating component of current. The current starts up from zero as though from a negative peak in its cycle. If the current were to continue as a pure sinusoidal wave, an increased average current would be required. Since there is no change in the steady-state potentials on the tube electrodes to sustain an increased current, the average value of the current wave returns to its original value exponentially with a time constant which may be shown to be equal to L multiplied by the mutual conductance of the tube.

It should be noted that if the timing wave potential at the grid and cathode were to start a quarter cycle earlier or later, that is, with an abrupt rise or fall of potential to maximum or minimum peak amplitude, the arrangement of Fig. 8 would become feasible because the constant of integration would equal zero, and the arrangements of Figs. 6 and 7 would acquire transient difficulties in that differentiation of the steep wave front would tend to produce tube overloading.

The arrangements of Figs. 6 and 7 can be combined as shown in Fig. 9 so that the inductance L and resistance $R_P$ in shunt with respect to each other are connected between the anode and the positive terminal of the direct voltage source and resistance $R_K$ and capacitance C in shunt with respect to each other are connected between the cathode and ground. This is the arrangement which is specifically utilized in the range unit of Figs. 3, 4 and 5. In this case, if the current $I_{R_P}$ through $R_P$ equals the current $I_C$ through C and if the current $I_L$ through L equals the current $I_{R_K}$ through $R_K$ $$E_P = -R_P I_C = -R_P C\frac{dE_K}{dt} = -L\frac{dI_L}{dt} = -\frac{L}{R_K}\frac{dE_K}{dt}$$

and $$\frac{L}{R_K} = R_P C$$

If, as before $$E_K = A \sin \omega t \text{ and } \frac{L}{R_K} = R_P C = \frac{1}{\omega}$$

then $E_P = -A \cos \omega t$.

In this embodiment resistance $R_K$ provides a direct current path from the cathode to ground and resistance $R_P$ critically damps the undesired oscillations which would be generated due to the shock-excitation of the inductance L if the damping were omitted. In the circuit arrangement shown in Fig. 3, the cathode resistance $R_K$ is made up effectively of resistors R15, R19 and twice the resistance of R14, all in parallel, since each is in an alternating current path between the cathode and ground. Twice the resistance of R14 is effectively in the circuit because of the impedance of the tuned circuit L2, C13. The screen grid capacitor C17 is returned to the cathode in order that the same alternating current may flow through the anode and cathode impedances. The cathode potential of tube V3 is such with respect to the control grid potential that the grid current is zero at all times. By variation of trimmer condenser C16 in the cathode circuit, it is readily possible to adjust the cathode and anode voltages to exact quadrature. The amplitude of these voltages are then equal if the inductance of L1 has the correct value in relation to the plate and cathode resistances.

In some cases it may be desirable to employ a continuous wave rather than an intermittent wave for the control grid potential $E_G$ in which case no difficulty will be experienced due to parasitic oscillations or starting transients as discussed above in connection with Figs. 7 and 8. Moreover, it may be desirable in some cases to employ a potential wave $E_G$ other than a sine wave. When any variable potential is impressed upon the control electrode, there will be produced at the cathode and anode electrodes, respectively, varying potentials one of which is proportional to the derivative of the other, within the obvious limitations imposed by stray capacitances, tube overloading, and the constant of integration in the case of the circuit of Fig. 8.

There are provided two phase inverter triodes V4.1 and V4.2 each for impressing upon opposite sector stator plates of a phase shift condenser C25 timing wave potentials which are 180 degrees out of phase with respect to each other. The anode current path for triode V4.1 may be traced from 300-volt source through resistor R24, 10,000-ohm resistor R23, the anode-cathode path, 1,500-ohm resistor R22 and 10,000-ohm resistor R21 to ground. The control grid of this triode is connected through 1-megohm resistor R20 to the common terminal of resistors R21 and R22. The anode current path for triode V4.2 may similarly be traced from the 300-volt source through resistor R24, 10,000-ohm resistor R28, the anode-cathode path, 1,500-ohm resistor R27, and 10,000-ohm resistor R25 to ground. One-megohm resistor R26 connects the control grid to the common terminal of resistors R27 and R25. A 0.1-microfarad condenser C83 provides a low impedance path from the negative terminal of resistor R24 to ground. The cathode of tube V3 is connected through 0.01-microfarad condenser C18 to the control grid of triode V4.1 and the anode of tube V3 is connected through 0.01-microfarad condenser C19 to the control grid of triode V4.2.

The mutual conductance of each of the triodes V4.1 and V4.2 is sufficiently large to cause the cathode potential of each to be an accurate copy of the potential of the corresponding control electrode. As the same current passes through R23 and R21, by way of the anode-cathode path of V4.1, the anode potential of V4.1 is equal in amplitude to the potential at the junction of R21 and R22, but 180 degrees out of phase therewith. Similarly, the anode potential of V4.2 is equal in amplitude to, but 180 degrees out of phase with, the potential at the junction of R25 and R27. In view of the phase relationship established in the circuit of V3, it may be seen that the four last-mentioned potentials are alike in amplitude, but that three of them differ in phase from the fourth by 90 degrees, 180 degrees and 270 degrees, respectively, this relationship being established at essentially the first instant of each timing wave train.

The phase shifter condenser C25 comprises a metallic ring 86, four metallic stator sectors 81, 82, 83 and 84 and a dielectric rotor 87 of a material having a dielectric constant considerably different from that of air. The phase shifter condenser is described in detail in my copending application, supra. The stator sector 81 is connected to the common terminal of resistor R23 and the anode of tube 4.1; stator sector 83 is connected to the common terminal of resistors R21 and R22; stator sector 82 is connected to the common terminal of resistor R28 and the anode of tube 4.2, and stator sector 84 is connected to the common terminal of resistors R25 and R27. Condensers C23 and C24 each of 10 micromicrofarads are connected between stator sectors 81 and 82, respectively, and ground. Variable 25-micromicrofarad condensers C21 and C22 are connected between stator sectors 83 and 84, respectively, and ground, these condensers being variable to allow for accurate balancing of the cathode and anode reactances.

The ring stator 86 of the phase shifter is connected by lead 49 to the input of a two-stage amplifier comprising electronic tubes V5 and V6 and the output of the amplifier is connected to a timing pulse generator circuit comprising electronic tubes V7 and V8. The lead 49 is connected through 100-ohm resistor R33 to the control grid of the tube V5. Anode potential is supplied to the tube from 300-volt source 51 through 1,000-ohm resistor R36 and 10,000-ohm resistor R35, the anode-cathode path, 180-ohm resistor R32 and 1,000-ohm resistor R31 to ground. Control grid biasing potential is provided due to anode current flowing through resistor R32, which bias is applied to the grid through 0.1-megohm resistor R29 and 0.47-megohm resistor R30 in series. A 0.01-microfarad condenser C27 connected from the common terminal of resistors R29 and R30 to the cathode of tube V5 by-passes alternating components of the voltage across R32. Screen grid voltage is supplied to tube V5 through resistor R36, 68,000-ohm resistor R37 and 100-ohm resistor R34, the common terminal of resistors R37 and R34 being connected through 0.01-microfarad condenser C29 to the cathode. Condenser C26 of 0.1 microfarad is connected between ground and one terminal of resistor R36 to suppress voltage variations of the 300-volt source. The anode of V5 is connected through 0.01-microfarad condenser C28 and 100-ohm resistor R40 to the control grid of amplifier tube V6. Anode voltage is supplied to tube V6 from the 300-volt source through resistor R36, 10,000-ohm resistor R43, the anode-cathode path and 180-ohm resistor R41 to ground. A 0.1-megohm resistor R38 is connected from the common terminal of condenser C28 and resistor R40 to ground. Screen grid voltage is supplied from the 300-volt source through resistor R36, 68,000-ohm resistor R44 and 100-ohm resistor R42, the common terminal of resistors R44 and R42 being connected through 0.01-microfarad condenser C31 to the cathode. Negative feedback is provided by connecting the anode of tube V6 through 0.1-megohm resistor R39 to the cathode of tube V5.

The amplified timing wave voltage at the anode of tube V6 is impressed through 0.01-microfarad condenser C30 and 100-ohm resistor R46 upon the control grid of the "center clipper" tube V7 of the timing pulse generator 22. The common terminal of resistor R46 and condenser C30 is connected through 0.1-megohm resistor R45 to ground and the tube cathode is connected through 10,000-ohm resistor R47 shunted by 50-microfarad condenser C33 to ground. Anode voltage is supplied to tube V7 from the 300-volt source through 1,000-ohm resistor R53 and 18,000-ohm resistor R49, and screen grid voltage is applied through 100-ohm resistor R50 from the voltage divider formed by 33,000-ohm resistor R51 and 33,000-ohm resistor R52, the common terminal of resistors R51 and R52 being connected through 1-microfarad condenser C34 to the cathode. Tube V7 acts as a cathode follower during the positive half cycles of the timing wave impressed upon its grid and is cut off during the negative half cycles. During the positive half cycles on the grid, when the grid potential first increases and then decreases, the anode potential first decreases and then increases. While the tube is cut off the anode potential is constant. The anode of tube V7 is connected through 150-micromicrofarad condenser C35 and 100-ohm resistor R56 to the control grid of tube V8, the cathode of which is grounded. Anode voltage is supplied to tube V8 through resistor R53 and 1,500-ohm resistor R57. Screen grid voltage is supplied from the 300-volt source through resistor R53, 0.1-megohm resistor R59 and 100-ohm resistor R58, the common terminal of resistors R59 and R58 being connected through 0.1-microfarad condenser C322 to ground. Condenser C321 of 0.1-microfarad is connected between the negative terminal of resistor R53 and ground. The cathode of tube V7 is made positive with respect to ground due to the connection of the cathode to the common terminal of the voltage dividing resistors R47 and R48 (1.8 megohms). The grid of tube V8 is biased positively due to its connection to the common terminal of the voltage dividing resistors R54 and R55 (1 megohm). During the quiescent periods when no wave is being generated by the timing wave generator, grid current flows in tube V8 and the grid is at a slightly positive potential. During the active periods when the timing wave is being generated, the change in anode potential of tube V7 causes the grid potential of tube V8 to be sharply decreased at the beginning of one-half cycle of the timing wave and to be sharply increased at the beginning of the following half cycle so that conduction in tube V8 is cut off and restored alternately. The resulting square wave at the anode of tube V8 is differentiated by means of 100-micromicrofarad condenser C36 and 1,500-ohm resistor R61, which elements are connected in series between the anode of tube V8 and ground, to produce alternately positive and negative sharp pulses across resistor R61.

The pulse selector 23 comprises a triode electronic device V1.2 and a pentode electronic device V10. Anode current is supplied to tube V1.2 from the 300-volt source through 1,000-ohm resistor R73 and 1-megohm resistor R62, the cathode being grounded. The common terminal of resistors R73 and R62 is connected through 1-megohm resistor R60 to the control electrode. There is provided a condenser charging circuit having a time constant of about 800-microseconds which may be traced from the positive terminal of the 300-volt source through resistors R73, R62, 750-micromicrofarad condenser C38, shunted by 100-micromicrofarad variable condenser C39, and 1,500-ohm resistor R61 to ground. The common terminal of resistor R62 and condenser C38 is connected through 100-ohm resistor R63 to the control electrode of tube V10. The anode current path for this tube comprises resistor R73, 1.8-megohm resistor R64, the anode-cathode path, a variable portion of the resistance of 20,000-ohm potentiometer R67 and 680-ohm resistor 87 to ground, the cathode also being connected through 0.003-microfarad condenser C40 to ground. The cathode potential may be varied by moving the variable tap of potentiometer R67, this potentiometer being in a series circuit which may be traced from the 300-volt source through resistor R73, 40,000-ohm resistor R68, potentiometer R67 and resistor R87 to ground. Screen grid potential is supplied from the common terminal of voltage dividing resistors R79 (47,000 ohms) and R69 (0.1 megohm) through 100-ohm resistor R65. Resistor R69 is shunted by 100-micromicrofarad condenser C42. The square wave c from start-stop generator 16 is impressed upon the control grid of tube V1.2 through lead 60. During the quiescent periods when the start-stop wave is positive, the grid of tube V1.2 is positive, grid current being drawn through resistor R60. As a result the anode-cathode resistance of the tube is low and the anode potential is reduced nearly to ground potential (about +1.1 volts). When tube V1.2 is cut off due to the negative portions 17 of start-stop wave c, condenser C38 and its trimmer C39 are charged through resistor R62 to a potential which rises exponentially toward a 300-volt asymptote. The alternately positive and negative timing pulses which appear across the resistor R61 are applied in series with the exponentially rising condenser voltage to the control grid of tube V10.

The selection of one of the timing pulses of each group of pulses is controlled by varying the setting of potentiometer R67 to vary the cathode potential of tube V10. The first pulse (26) of each group of pulses which raises the grid potential of tube V10 sufficiently with respect to the cathode potential to cause anode current to flow may be designated as the selected pulse since it causes the potential at the anode of tube V10 to drop sharply to control the production of a corresponding range pulse. If the setting of potentiometer R67 were varied progressively without varying the setting of the phase shifter condenser C25, the interval between the radiated pulses b and the corresponding selected pulses or range pulses 26 would vary in steps, the interval of each step corresponding to approximately 12.2 microseconds or a range of 2,000 yards. By coupling potentiometer shaft 34 to the shaft 29 of the phase shifter condenser by means of gears 24, the interval between the radiated pulses and the corresponding selected pulses or range pulses may be varied continuously. The resistance winding of the potentiometer R67 is preferably non-uniformly distributed to correct for the curvature of the exponentially rising voltage across the condensers C38 and C39 so that a change in cathode potential corresponding to a single revolution of the potentiometer shaft 29 will be equal to the potential difference at the grid of tube V10 between the peak potential of a timing pulse which is to be selected and the peak potential of a succeeding positive timing pulse at any time during each active interval. Instead of superposing the timing pulses upon the exponentially rising control grid potential of tube V10, they may be superposed upon the cathode potential of tube V10 by connecting one plate of each of condensers C38 and C39 directly to ground, connecting the lead from condenser C36 to the cathode of tube V10 and connecting a resistor between the cathode of tube V10 and condenser C40. In this case one of the negative timing pulses is selected.

There is provided an output amplifier comprising electronic devices V9.2 and V11 which repeats the selected pulses or range pulses and which suppresses the timing pulses following each of the selected pulses. The anode of tube V10 is connected through .0005-microfarad condenser C41 and 1.8-megohm resistor R71 in series to ground and the control grid of tube V9.2 is connected to the common terminal of condenser C41 and resistor R71. The anode current path of this tube may be traced from the positive terminal of the 300-volt source through resistor R73, 22,000-ohm resistor R72, the anode-cathode path and 470-ohm biasing resistor 82 to ground, the resistor R82 being shunted by 0.01-microfarad condenser C49. Filter condenser C323 of 0.1 microfarad is connected between the common terminal of resistors R73 and R72 and ground. The anode of tube 9.2 is connected through 100-micromicrofarad condenser C44 and 0.1-megohm resistor R74 in series to ground and the common terminal of the condenser and resistor is connected through 100-ohm resistor R77 to the control grid of tube V11. Positive biasing potential is provided for the cathode of tube V11 by connecting it to the common terminal of the potential dividing resistors R76 (0.22 megohm) and R75 (15,000 ohms) which are connected in series between the negative terminal of resistor R73 and ground, the resistor R75 being shunted by 0.01-microfarad condenser C46. Anode potential is supplied to tube V11 from the 300-volt source through resistor R73 and 33,000-ohm resistor R78. Screen grid voltage is also supplied from the 300-volt source through resistor R73, 18,000-ohm resistor R80 and 100-ohm resistor R79, the common terminal of resistors R79 and R80 being connected through 0.0005-microfarad condenser C47 to ground. The anode of tube V11 is connected through 0.002-microfarad condenser C48 and 1,800-ohm resistor R81 in series to ground. The primary winding of output transformer T1 is connected across resistor R81 to cause the production of range pulses $i$ across the secondary winding one terminal of which is grounded.

When tube V10 becomes conducting due to a positive timing pulse which is superposed upon the exponentially rising grid potential, the potential at the anode of tube V10 is reduced and condenser C41 discharges through a circuit comprising the anode-cathode path of tube V10 and resistor R71. Tube V9.2 which normally conducts is thus cut off and remains cut off due to the voltage drop across resistor R71 during the remainder of the active period and the timing pulses which follow the selected pulse are thus not repeated. The interruption of conduction through tube 9.2 due to the selected timing pulse causes the production of a positive pulse at the control grid of tube V11, causing it to pass extremely large anode current momentarily, thus producing a negative pulse at the anode of tube V11. The resulting range pulse at the secondary of transformer T1 may obviously be of either positive or negative polarity as desired. If desired, moreover, this output pulse may be utilized to generate a step as disclosed in my copending application, supra. A negative pulse is also produced at the common terminal of resistors R80 and R79 to cause 50-micromicrofarad condenser C45 to discharge through a path including the screen grid-cathode path of tube V11 and resistor R71 to reinforce the negative potential at the grid of tube V9.2 so that tube V9.2 is cut off very sharply and remains so until the end of the active period.

While triodes V1.1 and V1.2 are shown as individual tubes, these triodes may be within a single evacuated envelope since the triodes are cut off and restored in synchronism. Triodes V9.1 and V9.2 may also be within a single evacuated envelope. Triode V1.2 is not placed within the same envelope with triode V9.2 since cut off of triode tube V1.2 would not be complete while triode V9.2 is conducting.

The cathode ray device 30 comprises, in addition to the vertical and horizontal deflecting plates, a cathode 119, anodes 120 and a phosphorescent screen 123. The sweep wave $h$ produced by the sweep circuit 35 and applied to the deflecting plates 33 causes the cathode ray beam to sweep across the screen repeatedly in a horizontal direction, for example. The range pulses 26 from the output transformer T1 of the range unit are applied to one of the vertical deflecting plates 31 of the cathode ray tube to cause the production of a vertical deflection in one direction upon the screen 123 and the echo pulses $j$ from the radio receiver 13 are applied to the other vertical deflecting plates 31 to produce a vertical deflection of the cathode ray beam in the opposite direction. By rotating the shaft 29 of the phase shifting condenser C25 of the phase shifter and the shaft 34 of the potentiometer R67 of the pulse selector by means of a handle 126, the visual indication produced by the range pulses 26 may be caused to travel across the screen 123 and brought into alignment with the visual indication produced upon the screen by the echo pulses $j$. The distance to the object from which the echo pulses are received may then be read directly upon the revolution counter or distance indicator 32 which is calibrated in units of distance, each complete revolution of the shaft 29 changing the delay of the range pulses 26 with respect to the corresponding transmitted pulses $b$ by an interval corresponding to 2,000 yards.

In some cases it may be desirable to produce pulses which are delayed with respect to corresponding starting pulses $a$ by impressing only the start-stop wave $c$ upon the pulse producing circuit comprising electronic devices V1.2 and V10, the amount of delay being controlled by the setting of potentiometer R67 and the time constant of the condenser charging circuit comprising resistors R61 and R62 and condensers C38 and C39.

What is claimed is:

1. In combination, a plurality of electronic devices each having an anode, a cathode and a control electrode, an antiresonant circuit, a circuit comprising the anode-cathode path of each of said electronic devices and said antiresonant circuit, a source of anode current in said circuit, said anode-cathode paths of said electronic devices and said antiresonant circuit being in series with respect to each other and with respect to said source so that a single unidirectional current from said source flows through both said anode-cathode paths, and means for impressing between the cathode and control electrode of each of said electronic devices simultaneously a voltage for causing the resistance of the anode-cathode path of each of said devices to increase simultaneously thereby initiating the generation of an alternating wave.

2. In combination, two electronic devices each having an anode, a cathode and a control electrode, an antiresonant circuit, a circuit comprising the anode-cathode path of each of said electronic devices and said antiresonant circuit, all in series relation, a source of anode current in said circuit, means for impressing between the cathode and control electrode of each of said electronic devices simultaneously a voltage for causing the resistance of the anode-cathode path of each of said devices to increase simultaneously to a relatively high value thereby initiating the generation of an alternating wave, a third electronic device having an anode, a cathode and a control electrode, a space current circuit connecting the anode and cathode of said third device, means for impressing said alternating wave upon a path connecting the control electrode and cathode of said third device for causing a corresponding alternating wave to be set up in the anode-cathode circuit of said third device and means for impressing said alternating wave set up in said anode-cathode circuit upon said antiresonant circuit for causing the alternating wave impressed upon said control electrode-cathode path of said third device to be maintained at substantially constant amplitude during periods when the resistance of the anode-cathode paths of said two electronic devices is at said relatively high value.

3. In combination, a plurality of electronic devices each having an anode, a cathode and a control electrode, an antiresonant circuit, a series circuit comprising the anode-cathode path of each of said electronic devices and said antiresonant circuit, a source of anode current in said series circuit, said anode-cathode paths of said electronic devices and said antiresonant circuit being in series with respect to each other and with respect to said source so that a single unidirectional current from said source flows through both said anode-cathode paths, a condenser, connected in shunt with respect to the portion of said series circuit comprising said antiresonant circuit and the anode-cathode path of one only of said electronic devices, and means for impressing between the cathode and control electrode of each of said electronic devices simultaneously a voltage for causing the resistance of the anode-cathode path of each of said devices to increase simultaneously, thereby initiating the generation of an alternating wave, said condenser being charged by current from said source of anode current to provide a substantially fixed potential difference across said portion of said series circuit while said alternating wave is being generated.

4. In combination, an electronic device having an anode, a cathode and a control electrode, an antiresonant circuit, a circuit comprising the anode-cathode path of said electronic device and said antiresonant circuit in series relation, a source of anode current in said circuit, means for impressing between the cathode and control electrode of said electronic device a voltage for causing the resistance of the anode-cathode path of said device to increase to a relatively high value thereby intitiating the generation of an alternating wave, a second electronic device having an anode, a cathode and a control electrode, a space current circuit connecting the anode and cathode of said second device, means for impressing said alternating wave upon a path connecting the control electrode and cathode of said second device for causing a corresponding alternating wave to be set up in the anode-cathode circuit of said second device, and means for impressing said alternating wave set up in said anode-cathode circuit of said second device upon said antiresonant circuit for causing the alternating wave impressed upon said control electrode-cathode path of said second device to be maintained at substantially constant amplitude during periods when the resistance of the anode-cathode path of said first electronic device is at a relatively high value.

5. In combination, an electronic device having an anode, a cathode and a control electrode, an antiresonant circuit having a plurality of terminals, a circuit comprising the anode-cathode path of said electronic device and said antiresonant circuit in series relation, a source of anode current in said circuit, means for impressing between the cathode and control electrode of said electronic device a voltage for causing the resistance of the anode-cathode path of said device to increase to a relatively high value thereby initiating the generation of an alternating wave, a second electronic device having an anode, a cathode and a control electrode, a space current circuit connecting the anode and cathode of said second device including a current source and an impedance having one of its terminals connected to said cathode of said second device and its other terminal connected to a terminal of said current source, means for impressing said alternating wave between said control electrode of said second device and said terminal of said current source for causing a corresponding alternating wave to be set up across said impedance and resistive means for connecting the cathode of said second device to one of said terminals of said antiresonant circuit.

6. A combination in accordance with claim 5 in which said antiresonant circuit comprises an inductive element having a terminal connected intermediate its ends and in which said resistive means connects the cathode of said second electronic device to said terminal of said inductive element.

LARNED A. MEACHAM.

REFERENCES CITED

The following references are of record in the file of this patent:

UNITED STATES PATENTS

| Number | Name | Date |
| --- | --- | --- |
| 1,240,206 | Heising | Sept. 18, 1917 |
| 1,687,882 | Nichols | Oct. 16, 1928 |

FOREIGN PATENTS

| Number | Country | Date |
| --- | --- | --- |
| 304,382 | Great Britain | Jan. 24, 1929 |